United States Patent
Grandvallet et al.

(10) Patent No.: US 11,781,670 B2
(45) Date of Patent: Oct. 10, 2023

(54) ROCKER VALVE WITH ROCKER VALVE MECHANISM

(71) Applicant: FAS MEDIC S.A., Palezieux (CH)

(72) Inventors: Gilles Grandvallet, Lancrans (FR); Raphael Alvarez, Nyon (CH); Julien Schneider, Selestat (FR)

(73) Assignee: FAS MEDIC S.A., Palézieux (CH)

( * ) Notice: Subject to any disclaimer, the term of this patent is extended or adjusted under 35 U.S.C. 154(b) by 0 days.

(21) Appl. No.: 16/417,056

(22) Filed: May 20, 2019

(65) Prior Publication Data

US 2019/0353272 A1 Nov. 21, 2019

(30) Foreign Application Priority Data

May 21, 2018 (EP) .................................... 18173390

(51) Int. Cl.
*F16K 31/10* (2006.01)
*F16K 11/02* (2006.01)
(Continued)

(52) U.S. Cl.
CPC ............ *F16K 31/10* (2013.01); *F16K 11/022* (2013.01); *F16K 11/168* (2013.01); *F16K 31/0641* (2013.01); *Y10T 137/86847* (2015.04)

(58) Field of Classification Search
CPC ...... F16K 11/022; F16K 11/168; F16K 31/10; F16K 31/0641; F16K 31/0682;
(Continued)

(56) References Cited

U.S. PATENT DOCUMENTS 2,562,631 A * 7/1951 Morrison .................. F16K 7/16
251/129.17
2,935,086 A 5/1960 Lehman
(Continued)

FOREIGN PATENT DOCUMENTS

EP 2074345 B1 1/2011

OTHER PUBLICATIONS

Nitrile Rubber (NBR), Matweb, Material Property Data, taken from the internet on May 11, 2020; [website; http://www.matweb.com/search/DataSheet.aspx?MatGUID=75d3830136414f58802f3f8a1a1ed9a3] (Year: 2020).*
(Continued)

*Primary Examiner* — Craig J Price
(74) *Attorney, Agent, or Firm* — Young Basile Hanlon & MacFarlane, P.C.

(57) ABSTRACT

A rocker valve comprising a rocker valve mechanism in a valve body. The mechanism comprises a single pivot arm to which first and second plungers are pivotally fixed to act in opposition. The rocker valve includes a flexible seal member extending laterally across the first and second fluid ports and having a first sealing region attached to a plunger head of the first plunger and a second sealing region attached to a plunger head of the second plunger. When the single pivot arm is pivoted relative to the valve body, a rotation of at least one of the first and second plungers about its respective fixed pivot is constrained solely by the flexible seal member such that a lateral position of the plunger head is automatically adjusted by the flexible seal member to balance tensile forces in the flexible seal member around the plunger head.

19 Claims, 4 Drawing Sheets (51) Int. Cl.
*F16K 11/16* (2006.01)
*F16K 31/06* (2006.01)

(58) Field of Classification Search
CPC ..... Y10T 137/86847; Y10T 137/86622; Y10T 137/87507; Y10T 137/87338
USPC ..... 137/625.44, 625.65, 625.66; 251/129.17, 251/129.2
See application file for complete search history.

(56) References Cited

U.S. PATENT DOCUMENTS

| | | | | |
|---|---|---|---|---|
| 3,683,962 A * | 8/1972 | Good | ................... | F16K 31/105 137/868 |
| 3,991,788 A * | 11/1976 | Kull | ....................... | F16K 31/10 137/863 |
| 5,337,785 A * | 8/1994 | Romer | ................ | F16K 31/0641 137/625.65 |
| 5,653,422 A * | 8/1997 | Pieloth | ................ | F16K 31/0682 137/596.17 |
| 5,983,941 A * | 11/1999 | Fritz | ..................... | F16K 11/052 137/625.44 |
| 6,003,552 A * | 12/1999 | Shank | ................... | F16K 11/168 137/870 |
| 6,220,299 B1 * | 4/2001 | Arvidsson | ................. | F16K 7/16 137/329.05 |
| 6,276,173 B1 * | 8/2001 | Vanhuysse | .............. | B22F 3/002 65/374.12 |
| 6,484,754 B1 * | 11/2002 | Muth | .................... | F16K 11/052 137/625.44 |
| 6,929,019 B2 * | 8/2005 | Weinmann | ............ | F16K 31/006 137/15.21 |
| 7,070,162 B2 * | 7/2006 | Dzialakiewicz | .... | F16K 31/0682 251/129.08 |
| 8,434,514 B2 * | 5/2013 | Bezold | ................. | F16K 11/022 137/625.44 |
| 8,434,574 B1 * | 5/2013 | York | ....................... | B60L 55/00 180/2.2 |
| 8,752,584 B2 * | 6/2014 | Grandvallet | ............ | F16K 31/10 137/625.48 |
| 8,893,747 B2 * | 11/2014 | Wei | ..................... | F16K 31/0682 137/625.44 |
| 9,091,368 B2 * | 7/2015 | Scheibe | .................. | F16K 31/52 |
| 9,249,895 B2 * | 2/2016 | Hettinger | .............. | F16K 27/003 |
| 9,802,198 B2 * | 10/2017 | Futamata | .................. | F16K 7/14 |
| 9,856,986 B2 * | 1/2018 | Futamata | ............ | F16K 11/0525 |
| 10,221,957 B2 * | 3/2019 | Ohta | ....................... | F16K 31/06 |
| 10,288,187 B2 * | 5/2019 | Vogt | ..................... | F16K 11/022 |
| 10,396,646 B2 * | 8/2019 | Reiter | ................. | F16K 99/0015 |
| 10,508,751 B2 * | 12/2019 | Neal | ........................ | F16K 31/53 |
| 10,508,757 B2 * | 12/2019 | Vaccaro | .................. | F16L 3/133 |
| 11,047,501 B2 * | 6/2021 | Leeseberg | ........... | F16K 31/0655 |
| 2009/0146091 A1 * | 6/2009 | Arns | ................... | F16K 11/0525 251/129.16 |
| 2011/0140018 A1 * | 6/2011 | Wei | ..................... | F16K 31/0682 251/129.03 |
| 2012/0223264 A1 * | 9/2012 | Doerr | .................. | F16K 31/0682 251/129.15 |
| 2016/0091099 A1 * | 3/2016 | Scheibe | ................ | F16K 31/041 137/625.48 |
| 2016/0153577 A1 * | 6/2016 | Fuchs | ..................... | H01F 7/066 251/129.2 |
| 2016/0334024 A1 * | 11/2016 | Futamata | ............ | F16K 11/0525 |
| 2017/0314699 A1 | 11/2017 | Vogt et al. | | |
| 2021/0156406 A1 * | 5/2021 | Scheibe | .............. | F16K 31/0682 |

OTHER PUBLICATIONS

Material Properties for Silicone, Taken From Website www.matweb.com, Taken on Nov. 9, 2020; (Year: 2020).*
European Search Report dated Nov. 7, 2018 for European Patent Application No. EP 18173390.8.

* cited by examiner

ROCKER VALVE WITH ROCKER VALVE MECHANISM

CROSS-REFERENCE TO RELATED APPLICATIONS

This application claims foreign priority to European Patent Application No. 18173390.8, filed on May 21, 2018.

TECHNICAL FIELD

The present invention relates to rocker valves comprising rocker valve mechanisms. In particular, the present invention relates to rocker valves comprising a plurality of fluid ports and rocker valve mechanisms which are moveable to control fluid flow through the fluid ports.

BACKGROUND TO THE INVENTION

Valve mechanisms are used to control the flow of fluid, for example fluid under pressure. A valve typically comprises a valve body defining a plurality of ports, and a valve mechanism which is moveable within the valve body to perform the valve function by selectively opening or closing one or more of the ports to direct the fluid flow in a desired manner. One known type of such valve is a rocker valve. Rocker valves typically comprise a valve body within which a rocker valve mechanism is pivotally mounted to alternately open and close a pair of fluid ports when pivoted between end positions.

U.S. Pat. No. 2,935,086 discloses a pilot operated valve containing a rocker valve mechanism in the form of a lever attached at either of its ends to two plungers which are arranged to selectively close first and second outlet ports on either side of an inlet port. A solenoid is fixed to one of the plungers to pull the plunger upward and open the associated outlet port. This causes the other plunger to move downward to close the other outlet port. The lever is pivotally attached to one of the plungers via a slot. This enables relative movement in a lateral direction between the lever and the plunger to maintain alignment of the plungers with the outlet ports as the rocker valve mechanism pivots. However, it can also introduce undesirable play in the rocker valve mechanism, which can lead to leakage, noise, and increased component wear.

To address this, European Patent No. 2 074 345 B1 discloses a rocker valve comprising a rocker valve mechanism which has two parallel levers, or pivot arms, pivotally attached to a pivot post extending from the port portion of the valve. The double pivot arms reduce the amount of backlash in the rocker valve mechanism and constrain the lateral position of the plungers to keep the plungers upright and aligned with the ports as the pivot arms pivot within the valve. In some embodiments, a flexible membrane is attached to the valve body and over the plunger heads of the plungers to form a seal when pressed downwards against the ports.

There are drawbacks to both such prior art arrangements.

SUMMARY OF THE INVENTION

According to a first aspect of the invention, there is provided a rocker valve comprising a valve body including first and second fluid ports, and a rocker valve mechanism located at least partially in the valve body. The rocker valve mechanism comprises a single pivot arm pivotally mounted relative to the valve body, a first plunger pivotally fixed to the single pivot arm by a first fixed pivot, and a second plunger pivotally fixed to the single pivot arm by a second fixed pivot, the second plunger acting in opposition to and moving substantially in parallel with the first plunger when the single pivot arm is pivoted relative to the valve body. The rocker valve further comprises a flexible seal member extending in a lateral direction across the first and second fluid ports, wherein the flexible seal member comprises a first sealing region attached to the first plunger and a second sealing region attached to the second plunger. The flexible seal member is movable by the first plunger to a first position in which the first fluid port is closed by the first sealing region and is movable by the second plunger to a second position in which the second fluid port is closed by the second sealing region. The rocker valve mechanism is configured such that when the single pivot arm is pivoted relative to the valve body, a rotation of at least one of the first and second plungers about its respective fixed pivot is constrained solely by the flexible seal member.

When the single pivot arm is pivoted relative to the valve body, the first and second plungers move in an axial direction relative to the fluid ports and pivot relative to the single pivot arm about the first and second fixed pivots. This axial movement is permitted by compliance in the flexible seal member and results in tension in the flexible seal member. Where the lateral position of the plungers is constrained by the kinematics of the rocker valve mechanism, for example with using a double pivot arm arrangement as disclosed in EP 2 074 345 B1, the movement path of the plunger heads can result in lateral forces being applied to the flexible seal member by the plungers. These lateral forces can result in uneven tension in the flexible seal member around the plunger heads and lead to local stress increases within the flexible seal member. This can reduce the useful life of the flexible seal member and lead to leakage.

By configuring the rocker valve mechanism such that rotation of at least one of the first and second plungers about its respective fixed pivot is constrained solely by the flexible seal member, the lateral position of the plunger head of that plunger is automatically adjusted by the flexible seal member to balance the tensile forces in the flexible seal member around the plunger as the rocker valve mechanism pivots. This can reduce the maximum tensile force applied to the flexible seal member and, therefore, the maximum local stress levels experienced by the flexible seal member during operation. This can prolong the useful life of the flexible seal member and, therefore, the life of the valve. The claimed arrangement can also advantageously reduce the amount of friction between components of the rocker valve mechanism during operation.

The first and second plungers are pivotally fixed to the single pivot arm by first and second fixed pivots. The term 'fixed pivot_ means that the position of the pivot does not change relative to the plunger or the pivot arm during pivoting of the plunger or the pivot arm. This can reduce the amount of backlash in the rocker valve mechanism and increase rigidity relative to slotted pivot arrangements, such as that disclosed in U.S. Pat. No. 2,935,086. This can lead to improved accuracy of the actuation stroke and force.

The first fixed pivot is preferably towards a first end of the single pivot arm. The first fixed pivot may be at the first end of the single pivot arm. The second fixed pivot is preferably towards a second end of the single pivot arm. The second fixed pivot may be at the second end of the single pivot arm.

As used herein, the phrase 'constrained solely by the flexible seal member_ may include arrangements in which the at least one plunger is connected to other components besides the single pivot arm and the flexible seal member, provided those other components do not resist rotation of the at least one plunger to a greater degree than the flexible seal member. For example, the at least one plunger may be attached at its upper end to a rocker biasing device, such as a spring, which provides a downward force to the plunger but which flexes to allow the plunger to rotate about its fixed pivot. The at least one plunger may be connected only to the flexible seal member and the single pivot arm.

As used herein, the term 'axial_ refers to a direction which is substantially parallel to the longitudinal axis of one or both of the first and second plungers. The axial direction may also be substantially parallel to the central axis of one or both of the first and second fluid ports. The term 'lateral_ refers to a direction which is substantially perpendicular to the axial direction and parallel to the flexible seal member.

The rocker valve mechanism is preferably configured such that resistance to lateral movement of the plunger head of the at least one of the first and second plungers when a lateral force is applied to the plunger head is at least 0.002 N/m, preferably from 0.002 N/m to 0.04 N/m, more preferably from 0.004 N/m to 0.02 N/m, most preferably from 0.005 N/m to 0.01 N/m. The lateral force is applied in a lateral direction which is perpendicular to the fixed pivot about which that plunger rotates relative to the single pivot arm. This arrangement has been found to provide a particularly effective combination of sufficient rigidity in the rocker valve mechanism while still allowing the lateral position of the plunger head to be sufficiently adjusted to reduce local stress increases in the flexible seal member.

The flexible seal member preferably has a lateral stiffness of at least 0.002 N/m. The flexible seal member preferably has a lateral stiffness of from 0.002 N/m to 0.04 N/m, more preferably from 0.004 N/m to 0.02 N/m, most preferably from 0.005 N/m to 0.01 N/m. The lateral stiffness refers to the stiffness of the flexible seal member in the lateral direction. That is, the degree to a point on the flexible seal member is displaced in the lateral direction under lateral load. This can ensure that the at least one plunger remains substantially aligned with its associated fluid port. It also allows the flexible seal member to be moved to the first and second positions without requiring excessive force from the first and second plungers.

The stiffness of the flexible seal member may be varied for a given application by changing its geometry, for example thickness as a function of length, the material used, or both.

The flexible seal member is preferably formed from a material having a Young s modulus of at least 1 MPa, more preferably from 1 MPa to 20 MPa, more preferably from 1 MPa to 10 MPa, most preferably from 2 MPa to 6 MPa, ideally of 4 MPA. This can ensure that the flexible seal member is sufficiently stiff so that the at least one plunger remains substantially aligned with its associated fluid port. It also allows the flexible seal member to be moved to the first and second positions without requiring excessive force from the first and second plungers and without requiring an inconveniently thick flexible seal member.

The flexible seal member preferably has a sheet thickness of from about 0.1 to about 1 mm, more preferably from about 0.1 to about 0.4 mm, most preferably about 0.2 mm. The term 'sheet thickness_ refers to the general thickness of the flexible seal member in the axial direction. This may exclude areas of local thickness increase, such as in the first and second sealing regions. The sheet thickness may refer to the thickness of one or more regions of the seal member between the first and second sealing regions. The sheet thickness may refer to the thickness of the regions of the seal member between each of the first and second sealing regions and the valve body. The sheet thickness may refer to the thickness of substantially the entire area of the flexible seal member.

The flexible seal member preferably has a length to sheet thickness ratio of at least 15, preferably from 15 to about 150, more preferably from about 35 to about 150. The term 'length_ refers to the maximum dimension of the flexible seal member in the lateral direction.

The flexible seal member may be formed from any suitable material. The flexible seal member is preferably formed from an elastomeric material, for example EPDM, FPM, FFPM, MQ, MFQ, NBR, or any combination thereof.

The first and second sealing regions are attached to the first and second plungers. With this arrangement, the first and second plungers are able to pull the first and second sealing regions away from the fluid ports, i.e. upwards, as well as being able to push the first and second sealing regions towards the fluid ports, i.e. downwards. This can improve the unblocking action of the plungers and increase flow volume through the fluid ports. The first and second plungers may merely be adhered to a flat, top surface of the first and second sealing regions of the flexible seal member. In such embodiments, the thickness of the flexible seal member may be substantially constant. Alternatively, the flexible sealing member may be thicker in the first and second sealing regions in order to accommodate movement and/or flexing of the seal member.

The flexible seal member may be over-moulded on the first and second plungers in one or both of the first and second sealing regions. The flexible seal member may be over-moulded with a primer in one or both of the first and second sealing regions. This can increase the strength with which the flexible seal is attached to the plungers.

The first and second sealing regions may each comprise a receptacle within which first and second plunger heads of the first and second plungers are retained. The first sealing region may comprise a first receptacle in which the first plunger head is received and retained. The second sealing region may comprise a receptacle in which the second plunger head is received and retained. This facilitates accurate and secure attachment of the flexible seal member to the first and second plungers. The flexible seal member may be over-moulded with a primer in one or both of the first and second sealing regions to increase the degree to which a plunger is held in its respective receptacle.

The rocker valve mechanism is preferably configured such that when the single pivot arm is pivoted relative to the valve body, a rotation of both of the first and second plungers about its respective fixed pivot is constrained solely by the flexible seal member. In such embodiments, the single pivot arm, first and second plungers and the flexible seal member act as a four-bar linkage. In that linkage, the pivot points between the plungers and the flexible seal are provided by compliance in the flexible seal member.

With this arrangement, the lateral position of both of the first and second plunger heads is automatically adjusted to balance the tensile forces in the flexible seal member around both plungers as the rocker valve mechanism pivots. This can reduce the maximum tensile force applied to the flexible seal member and, therefore, the maximum local stress levels present in the flexible seal member during operation. This can prolong the useful life of the flexible seal member and, therefore, the life of the valve.

The rocker valve may be actuated using an external actuator. The rocker valve may further comprise an actuator configured to actuate the rocker valve mechanism.

The rocker valve mechanism may be biased towards the first position so that the first position is the normally closed position. The rocker valve mechanism may be biased towards the second position so that the second position is the normally closed position.

The rocker valve may further comprise a biasing device configured to exert a first biasing force on the rocker valve mechanism to bias the flexible seal member towards the first position. The biasing device may be configured to exert the first biasing force directly on the rocker valve mechanism, or indirectly via one or more intermediate components. The biasing device may be configured to exert the first biasing force on the first plunger. The biasing device may be configured to exert the first biasing force on the second plunger. The rocker valve may further comprise an actuator configured to exert an actuation force in opposition to the first biasing force. The actuator may be configured to exert the actuation force on the rocker valve mechanism. In such embodiments, the biasing device may be configured to exert the actuation force directly on the rocker valve mechanism, or indirectly via one or more intermediate components. Preferably, the actuator is configured to exert the actuation force on the biasing device.

The rocker valve may further comprise a rocker biasing device configured to exert a second biasing force on the rocker valve mechanism to bias the flexible seal member towards the second position. Preferably, the first biasing force is greater than the second biasing force so that the flexible seal member is retained in the first position by the first plunger when the actuator is not actuated. The flexible seal member may be moved to the second position when the actuator is actuated such that a sum of the actuation force and the second biasing force is greater than the first biasing force. In such an embodiment, the actuation force and the second biasing force together overcome the first biasing force in order to move the flexible seal member to the second position.

The rocker biasing device may comprise any suitable biasing device. The rocker biasing device may comprise a spring. The spring may comprise a compression spring, a tensile spring, or a torsion spring. For example, the rocker biasing device may comprise a helical or coil spring.

The rocker biasing device may be configured to exert the second biasing force directly on the rocker valve mechanism, or indirectly via one or more intermediate components. The rocker biasing device may be configured to exert the second biasing force on the first plunger. The rocker biasing device may be configured to exert the second biasing force on the second plunger. In some embodiments, the rocker biasing device acts directly on the second plunger. For example, the rocker biasing device may be received in a bore in the second plunger. Alternatively, a portion of the second plunger may be received in the rocker biasing device. For example, an end portion of the second plunger opposite to the second sealing region may be received in the rocker biasing device. The rocker biasing device may also be retained against the valve body. For example, a portion of the rocker biasing device may be received in a bore or receptacle formed in a wall of the valve body.

The actuator may be any suitable actuator. The actuator may comprise an electromagnetic actuator. In certain embodiments, the actuator comprises an armature and an electromagnetic coil configured to actuate the armature. Where the rocker valve comprises a biasing device, the electromagnetic coil may be configured to actuate the armature in opposition to the biasing device. The biasing device may comprise an armature biasing device configured to exert the first biasing force on the rocker valve mechanism via the armature. The actuator may be fixed to the rocker valve mechanism. In such embodiments, the axial position of the actuator is fixed relative to the rocker valve mechanism at the point of connection. For example, the actuator may be fixed to the first plunger. With this arrangement, the actuator and the first plunger move together in the axial direction.

Preferably, the actuator is configured to transfer the first biasing force to the first plunger in a first axial direction and to exert the actuation force on the biasing device in a second axial direction which is opposite to the first axial direction, and wherein the actuator is free to move in the second axial direction relative to the first plunger.

With this arrangement, the actuator is configured to exert a downward force on the first plunger to bias the flexible seal member towards the first position but does not pull upwards on the first plunger when actuated. This can be particularly advantageous for embodiments in which the actuator comprises an armature and an electromagnetic coil configured to actuate the armature to generate the actuation force, since the actuation force will generally increase as the armature moves towards the electromagnetic coil and away from the fluid ports. Where the actuator is fixed to the rocker valve mechanism, this can lead to over-extension of the flexible seal member and increased fatigue wear. By allowing the actuator to move in the second axial direction, relative to the first plunger, the increased actuation force as the actuator moves in the second axial direction away from the ports is not transferred to the first plunger or, therefore, to the flexible seal member. This can prolong the useful life of the flexible seal member.

The actuator may further comprise an actuator plunger by which the first biasing force is transferred to the rocker valve mechanism. Where the actuator comprises an armature and an electromagnetic coil, the actuator plunger may be a discrete component, or may be integral with the armature.

In some embodiments, a portion of the rocker valve mechanism may be slidably received in a portion of the actuator. For example, the first plunger may be slidably received within a bore in a portion of the actuator, such as a bore in an actuator plunger. Such an arrangement permits relative movement between the actuator and the rocker valve mechanism in the second axial direction. This arrangement may substantially prevent relative movement in the lateral direction between the actuator and the first plunger. Thus, in such embodiments, the rotation of the first plunger about the first fixed pivot may be constrained by the actuator.

In some embodiments, the first plunger and the actuator may be moveable in the lateral direction relative to each other. This means that rotation of the first plunger about the first fixed pivot is not constrained by the actuator and may be constrained only by the flexible seal member. For example, the actuator may be configured to transfer the first biasing force to the first plunger at a substantially planar contact surface. In such embodiments, the actuator and the first plunger may slide against each other in the lateral direction along the planar contact surface.

The rocker valve mechanism may be fixed within the valve body. One or more components of the rocker valve mechanism may be removable from the valve body. The rocker valve mechanism may comprise a modular unit. The rocker valve mechanism may be a modular rocker valve mechanism which is removable from the valve body. This allows a rocker valve mechanism to be selected according to desired valve characteristics, such as valve actuation speed, plunger stroke length, valve actuation force, biasing device force, or biasing device size.

The fluid ports are separated by predetermined spacings. The fluid ports may be provided as part of a port portion of the valve body. The first and second fluid ports may form part of a removable port portion of the valve body which is removable from the rocker valve. This allows the spacings between the fluid ports to be varied along with the size and shape of the fluid ports by selection of the appropriate port portion. Where the rocker valve mechanism is a modular rocker valve mechanism which is removable from the valve body, a removable fluid port portion facilitates selection and matching of the removable port portion and the removable modular rocker valve mechanism according to the desired valve configuration.

The valve body comprises first and second fluid ports. Where the first and second fluid ports are the only fluid ports, the rocker valve can be used to selectively open or close first and second flow channels in communication with the first and second fluid ports. Preferably, the valve body comprises a third fluid port. The third fluid port is preferably open. In such embodiments, preferably the third fluid port is in communication with the second fluid port when the first fluid port is closed, and is in communication with the first fluid port when the second fluid port is closed. In such embodiments, at least one of the fluid ports is a fluid inlet and at least one of the fluid ports is a fluid outlet. For example, the third fluid port may be a fluid inlet and the first and second fluid ports may each be a fluid outlet. This allows the rocker valve mechanism to be used to direct fluid flow from the third fluid port through either the first or second fluid port as required.

The single pivot arm is pivotally mounted relative to the valve body. This means that the single pivot arm can be pivoted relative to the valve body. The single pivot arm may be pivotally attached to the valve body. The single pivot arm may be attached to the valve body directly, or indirectly via one or more intermediate components. The single pivot arm may be pivotal relative to the valve body about a fixed pivot. That is, about a pivot having a fixed position relative to both the single pivot arm and the valve body. The single pivot arm may be pivotally fixed to a pivot post extending from the valve body in the region of fluid ports. In some embodiments, the fluid ports are provided as part of a removable port portion of the valve body and the single pivot arm is pivotally fixed to a pivot post extending from the removable port portion. The pivot post may extend from the removable port portion into a chamber defined by the valve body. The single pivot arm may be pivotally fixed to the pivot post by a pivot pin.

Where the fluid ports are provided as part of a removable port portion, at least part of the flexible seal member may be received in the port portion. Preferably, the port portion is sealed to the valve body by the flexible seal member. The flexible seal member may be retained in the valve body by a seal retainer. The seal retainer may be positioned between the valve body and the port portion. The seal retainer may hold the seal member in place against the port portion.

BRIEF DESCRIPTION OF THE DRAWINGS

Further features and advantages of the present invention will be further described below, by way of example only, with reference to the accompanying drawings in which.

DETAILED DESCRIPTION OF THE INVENTION

Figure 1:
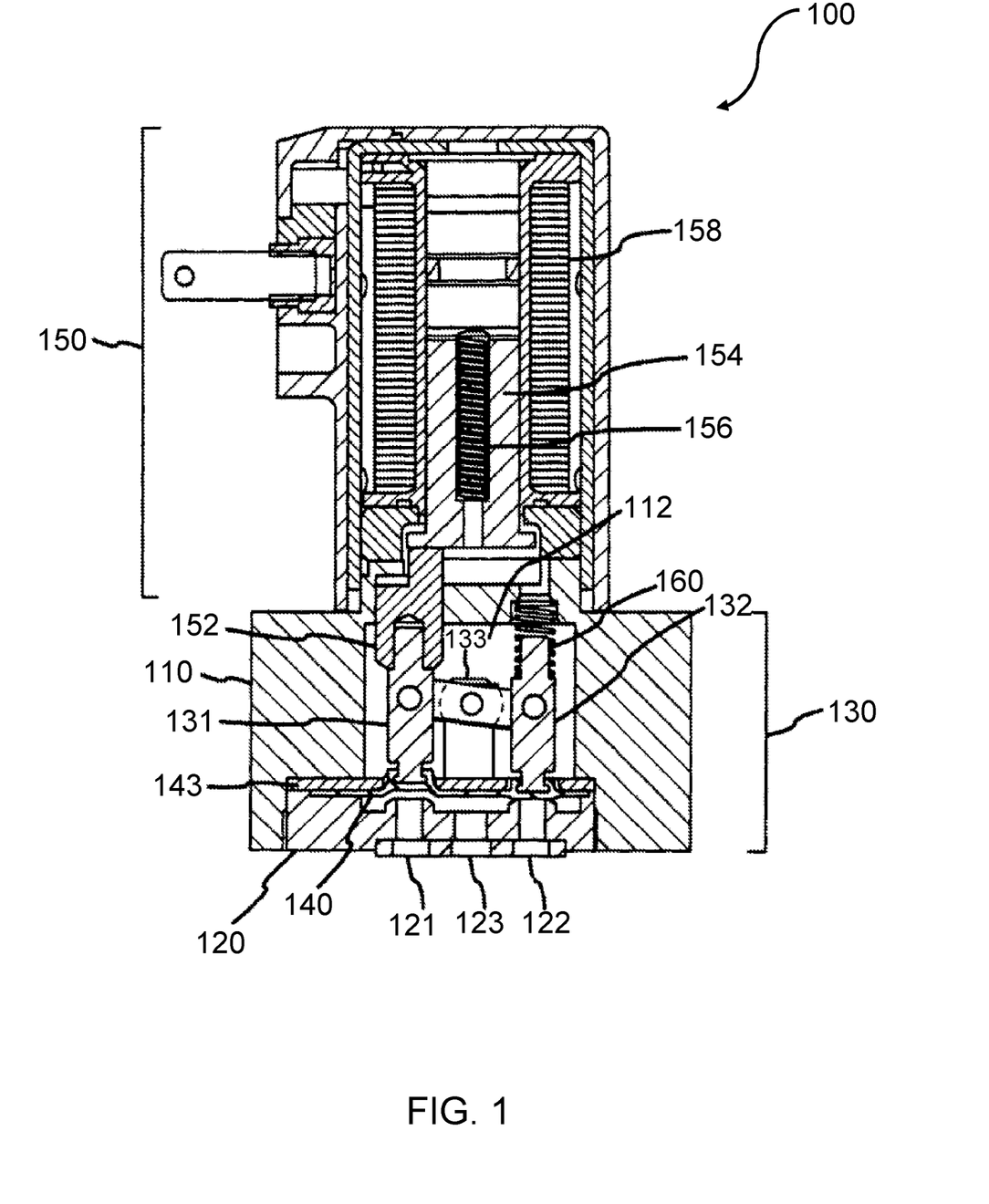
FIG. 1 is a cross-sectional view of a rocker valve according to an embodiment of the invention.

FIG. 1 is a cross-sectional view of a rocker valve 100 according to an embodiment of the invention. The rocker valve 100 includes a valve body 110 including a chamber 112, a removable port portion 120, a rocker valve mechanism 130 located at least partially within the chamber 112, a flexible seal member 140 and an actuator 150.

The port portion 120 includes a first fluid port 121, a second fluid port 122, and a third fluid port 123. As shown in more detail in FIG. 2, the first fluid port 121 communicates with a first valve seat 124 and the second fluid port 122 communicates with a second valve seat 125. The rocker valve mechanism 130 can selectively block and unblock the first fluid port 121 and the second fluid port 122 and thereby regulate a fluid flow. The first, second and third fluid ports 121-123 are separated by predetermined spacings. The port portion 120 may be removably attached to the valve body 110. With this arrangement, the spacings and the size and shape of the fluid ports can be varied as desired through the selection and attachment of the appropriate port portion 120 to the valve body 110 (see FIG. 4 and the accompanying discussion).

The actuator 150 includes an actuator plunger 152, an armature 154, an armature biasing device 156, and an electromagnetic coil 158. The armature 154 is actuated by the coil 158. The armature biasing device 156 exerts a first biasing force on the armature 154 which is transferred to the rocker valve mechanism 130 via the armature 154 and the actuator plunger 152 to bias the rocker valve mechanism 130 towards a first position in which the first fluid port 121 is blocked. In the embodiment shown, the actuator 150 comprises an electromagnet actuator. However, it should be understood that the actuator 150 can comprise any manner of actuator that moves the actuator plunger 152 in a substantially reciprocating motion.

The valve further comprises a rocker biasing device 160 positioned in the valve chamber 112 between the valve body 110 and the rocker valve mechanism 130. The rocker biasing device exerts a second biasing force on the rocker valve mechanism 130 in opposition to the first biasing force.

As discussed in more detail below in relation to FIGS. 2 and 3, the rocker valve mechanism 130 includes a first plunger 131 and a second plunger 132. The second plunger 132 acts in opposition to and moves substantially in parallel with the first plunger 131. The first plunger 131 and the second plunger 132 move portions of the seal member 140 to selectively block and unblock the first fluid port 121 and the second fluid port 122.

The rocker valve mechanism 130 in some embodiments comprises a modular unit. Because of the modularity of the rocker valve mechanism 130, the rocker valve mechanism 130 can be selected according to desired valve characteristics, such as valve actuation speed, plunger stroke length, valve actuation force, biasing device force/size, etc. When used with the removable port portion 120, the rocker valve mechanism 130 and port portion 120 can be selected and matched as desired.

The actuation of the rocker valve mechanism 130 is provided by the actuator 150 via the actuator plunger 152. The rocker valve mechanism 130 is configured to be biased toward a first, non-actuated position blocking the first fluid port 121 (as shown in FIG. 2) and unblocking the second fluid port 122. Therefore, the first fluid port 121 comprises a normally closed (NC) port and the second fluid port 122 comprises a normally open (NO) port. The rocker valve mechanism 130 is further configured to be actuated to a second position blocking the second fluid port 122 (as shown in FIG. 2). This actuated position occurs when the electromagnetic coil 158 is energized.

The flexible seal member 140 is positioned between the port portion 120 and the valve body 110 when the rocker valve mechanism 130 is assembled. The port portion 120 in some embodiments receives at least part of the seal member 140. Advantageously, the seal member 140 can seal the port portion 120 to the valve body 110. In some embodiments, the seal member 140 is retained in the valve body 110 by a seal retainer 143. The seal retainer 143 is positioned between the port portion 120 and the valve body 110. The seal retainer 143 holds the seal member 140 in place against the port portion 120. The flexible seal member 140 is attached to the first plunger 131 at a first sealing region 141 and to the second plunger 132 at a second sealing region 142.

In use, the flexible seal member 140 is displaced by both the first plunger 131 and the second plunger 132 at the first sealing region 141 and the second sealing region 142, respectively. In this manner, the seal member 140 is movable by the first plunger 131 and the second plunger 132 to alternatingly block and unblock the first fluid port 121 and the second fluid port 122 with the first and second sealing regions 141 and 142.

In FIG. 1, the armature 154 and the rocker valve mechanism 130 are shown in intermediate positions. In a normal, non-actuated position (i.e., when the electromagnetic coil 158 is de-energized), the armature 154 is released from the coil 158 and is biased by the armature biasing device 156 to a fully downward position (as shown in FIG. 3). The armature biasing device 156 acts substantially in opposition to the rocker biasing device 160 and overpowers the rocker biasing device 160. In addition, the rocker biasing device 160 forces the actuator plunger 152 to follow the armature 154 when the armature 154 moves to the fully upward, actuated position (as shown in FIG. 2).

Figure 2:
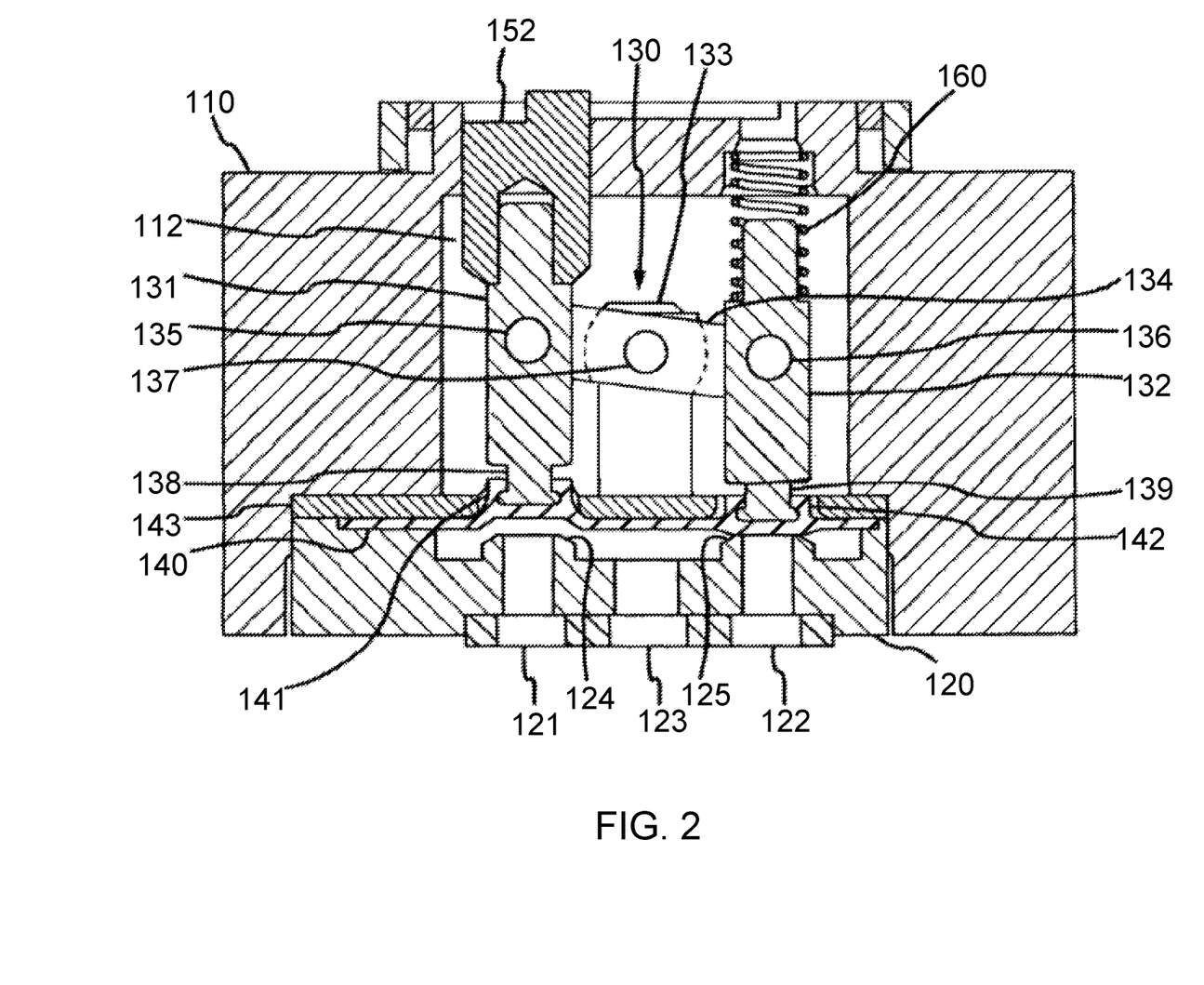
FIG. 2 is a cross-sectional view showing a detail of the rocker valve mechanism of the rocker valve of FIG. 1, showing the rocker valve in an actuated condition.

FIG. 2 is a cross-sectional view showing detail of the rocker valve mechanism 130 with the rocker valve 100 in an actuated position. In this position, the electromagnetic coil 158 is energized and pulls the actuator plunger 152 upward against the armature biasing device 156. This allows the rocker biasing device 160 to push the second plunger 132 downwards so that the second fluid port 122 is blocked by the flexible seal member 140. With this movement, the first plunger 131 is moved upwards to unblock the first fluid port 121.

The rocker valve mechanism 130 further comprises a pivot post 133 extending from the port portion 120. A single pivot arm 134 is pivotally affixed to the pivot post 133 by a third pivot pin 137. The first plunger 131 is pivotally affixed by a first pivot pin 135 to a first end of the pivot arm 134. The second plunger 132 is pivotally affixed by a second pivot pin 136 to a second end of the pivot arm 134. The lengths of the pivot arm 134 on either side of the pivot post 133 can be equal in length or can be unequal in length. The distances from the first and second pivot pins 135 and 136 to the third pivot pin 137 may be equal or may be unequal.

The second plunger 132 is biased downward by the rocker biasing device 160. The second plunger 132 can therefore press the second sealing region 142 of the seal member 140 against the second valve seat 125. In the embodiment shown, the rocker biasing device 160 comprises a helical or coil spring. However, the rocker biasing device 160 can comprise any manner of biasing device.

It can be seen from FIG. 2 that a portion of the rocker biasing device 160 can fit to or be retained by an upper end of the second plunger 132 in some manner. Another portion of the rocker biasing device 160 can fit to or be retained by the valve body 110. In the embodiment shown, a portion of the rocker biasing device 160 fits into a bore or receptacle formed in the chamber 112 of the valve body 110. The actuator plunger 152 extends into the chamber 112 through an orifice in the valve body 110 and the upper end of the first plunger 131 is slidably received in a bore or receptacle formed in the lower end of the actuator plunger 152. With this arrangement, the first plunger 131 is free to move axially relative to the actuator plunger 152. In the embodiment shown, lateral movement of the first plunger 131 relative to the actuator plunger 152 may be limited or prevented by the walls of the bore in the actuator plunger 152. Alternatively, lateral movement of the first plunger 131 relative to the actuator plunger 152 can be permitted by providing sufficient clearance between the first plunger 131 and the walls of the bore in the actuator plunger 152. In other embodiments, the upper end of the first plunger 131 may abut the lower end of the actuator plunger 152 such that the first plunger 131 is free to move transversely relative to the actuator plunger 152. This can reduce the degree to which the rocker valve mechanism 130 is constrained.

With the arrangement shown, rotation of the second plunger 132 about the second fixed axis is constrained solely by the flexible seal member 140. This has been surprisingly found to improve the reliability of the valve by allowing the lateral position of the second plunger to be adjusted to reduce the stress levels in the flexible seal member. This is contrary to the general understanding in the art that valve reliability is improved by increasing the constraints on the lateral movement of the plungers to reduce compliance in the mechanism.

When the coil 158 is energized, the first plunger 131 is allowed by the actuator plunger 152 to move upward. At the same time, the second plunger 132 is depressed by the rocker biasing device 160. As a result, the single pivot arm 134 moves the first plunger 131 upward. When the first plunger 131 is released by the actuator plunger 152, the pivot arm 134 transfers the actuation force provided by the rocker biasing device 160 to the first plunger 131. As a result, the second (NO) fluid port 122 is blocked, and the first (NC) fluid port 121 is unblocked.

In the embodiment shown, the first plunger 131 includes a first plunger head 138 and the second plunger 132 includes a second plunger head 139. Correspondingly, the seal member 140 includes the first sealing region 141 and the second sealing region 142. The first and second sealing regions 141 and 142 can comprise receptacles, wherein the first plunger head 138 and the second plunger head 139 fit into the first sealing region 141 and the second sealing region 142. The first and second sealing regions 141 and 142 therefore can be attached to the first and second plungers 131 and 132. Consequently, the first and second plungers 131 and 132 are able to pull a region of the seal member 140 upward as well as being able to push a region of the seal member 140 downward. This improves the unblocking action of a plunger and increases a flow volume through the port.

Alternatively, the first and second plungers 131 and 132 can merely contact a top surface of the first and second sealing regions 141 and 142. In such embodiments, the first and second sealing regions 141 and 142 may comprise thicker or denser portions of the seal member 140 in order to accommodate movement and/or flexing of the seal member.

Advantageously, the rocker valve 100 can be configured by appropriate selection of the rocker valve mechanism 130 or by selection of specific components of the rocker valve mechanism 130. For example, the pivot arm 134 can be chosen in order to select a desired lever arm and therefore to select a force and actuation stroke transmitted to the second plunger 132.

Advantageously, the rocker valve 100 may be configured such that the first and second sealing portions 141 and 142 are always displaced substantially perpendicularly to the corresponding valve seat 124 or 125. In addition, the first or second sealing portion 141 or 142 is preferably displaced substantially in parallel with the other sealing portion 142 or 141. This can lead to improvements in sealing quality, including a higher pressure capability, increased flow through the rocker valve 100, reduced power consumption in the actuator 150, and increased life expectancy of the seal member 140.

Figure 3:
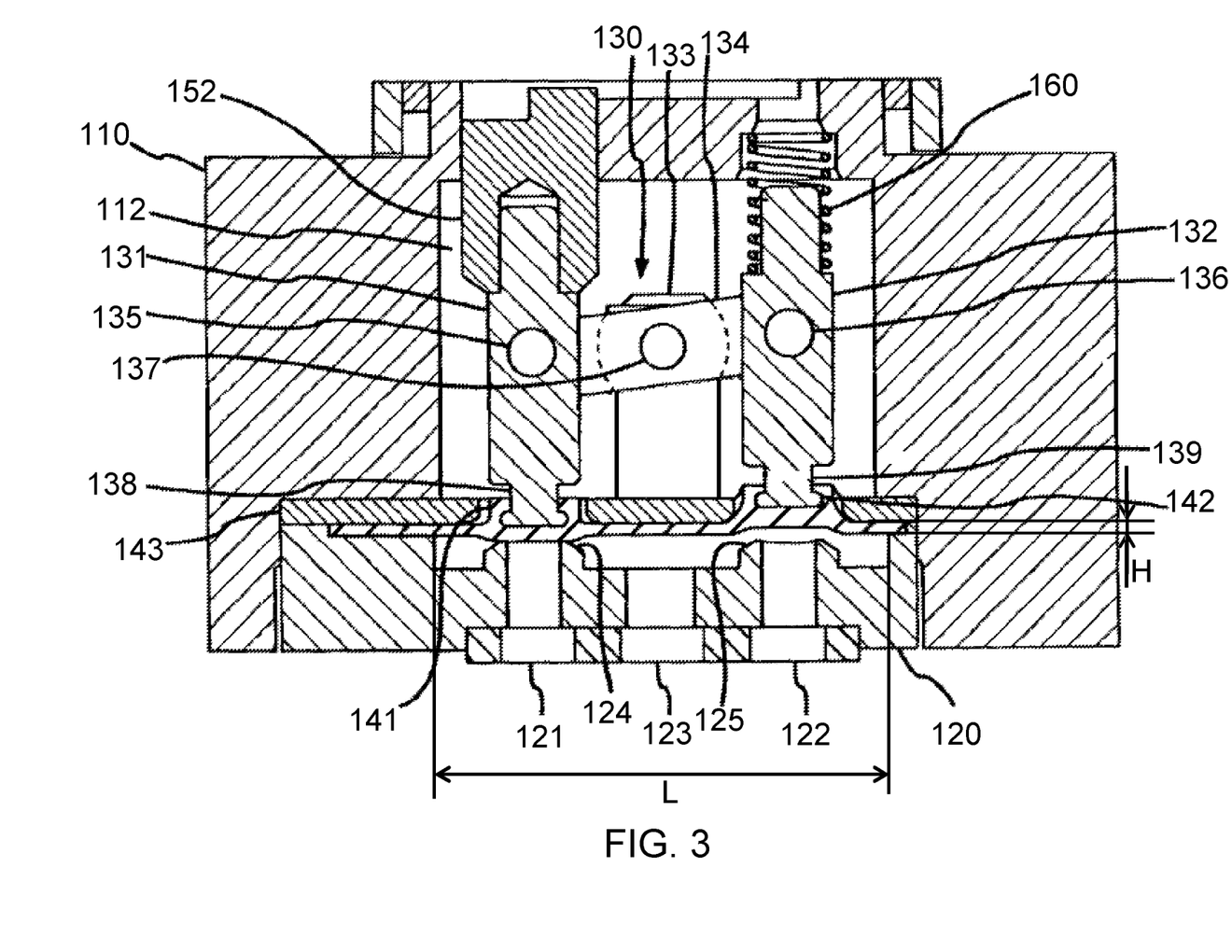
FIG. 3 is a cross-sectional view showing a detail of the rocker valve mechanism of the rocker valve of FIG. 1, showing the rocker valve in a non-actuated condition.

FIG. 3 is a cross-sectional view showing the rocker valve mechanism 130 in a non-actuated position. In this figure, the coil 158 has been de-energized, releasing the armature 154 and allowing the armature biasing device 156 to move the armature 154 and the actuator plunger 152 fully downward. As a result, the first plunger 131 is moved fully downward, blocking the first fluid port 121. At the same time, the second plunger 132 has been lifted, unblocking the second fluid port 122. As shown in FIG. 3, the flexible seal member has a sheet thickness indicated by dimension "H" and has a length indicated by dimension "L". The sheet thickness H is the general thickness of the flexible seal member in the axial direction. This may exclude areas of local thickness increase, such as in the first and second sealing regions. Preferably, the flexible sheet member has a sheet thickness of from about 0.1 to about 1 mm, more preferably from about 0.1 to about 0.4 mm, most preferably about 0.2 mm. The length L is the maximum dimension of the flexible seal member in the lateral direction. Where the flexible seal member extends into the walls of the valve body on either side, for example into the region between the port portion and the remainder of the valve body as shown in FIG. 3, the length L may correspond only to the portion of the flexible seal member which is moveable. That is, the length L may exclude end portions of the flexible seal member which extend into the valve. The relationship between the sheet thickness H and the length L can be important for selecting the flexibility of the flexible seal member. Preferably, the flexible seal member has a length to sheet thickness ratio of at least 15, preferably from 15 to about 150, more preferably from about 35 to about 150.

Figure 4:
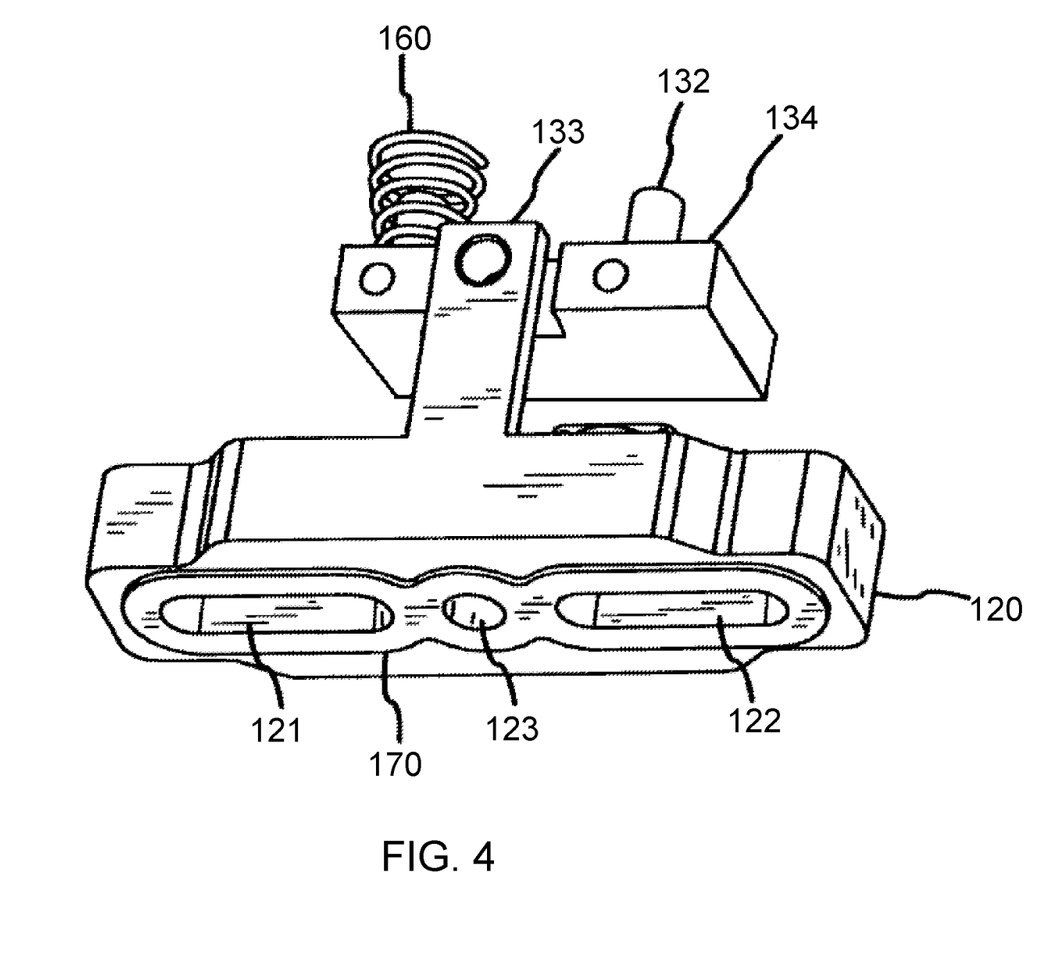
FIG. 4 shows an underside of the rocker valve mechanism of the rocker valve of FIG. 1.

FIG. 4 shows an underside of the rocker valve mechanism 130. This view shows the first fluid port 121, the second fluid port 122, and the third fluid port 123. In the embodiment shown, the first fluid port 121 and the second fluid port 122 comprise elongated slots, while the third fluid port 123 comprises a substantially circular port. Corresponding fittings can be accepted by the fluid ports 121-123. The rocker valve mechanism 130 can further include a gasket 170 that seals one or more corresponding fittings to the port portion 120. A fitting can compress the gasket 170 in order to form a seal.

The rocker valve mechanism and rocker valve according to the invention can be employed according to any of the embodiments in order to provide several advantages, if desired. The invention provides a rocker valve in which the rotational position of at least one of the plungers is constrained only by the flexible seal member. This can facilitate a reduction in the stress levels within the flexible seal member and thereby improve seal member lifespan.

The invention claimed is:

1. A rocker valve comprising:
a valve body comprising first and second fluid ports;
a rocker valve mechanism located at least partially in the valve body, comprising:
a single pivot arm pivotally mounted relative to the valve body;
a first plunger pivotally fixed to the single pivot arm by a first fixed pivot, the first fixed pivot having a position which is fixed relative to the first plunger and the single pivot arm during pivoting of the single pivot arm; and
a second plunger pivotally fixed to the pivot arm by a second fixed pivot, the second fixed pivot having a position which is fixed relative to the second plunger and the single pivot arm during pivoting of the single pivot arm, and the second plunger acting in opposition to and moving substantially in parallel with the first plunger when the single pivot arm is pivoted relative to the valve body;
wherein the rocker valve mechanism does not include another pivot arm that the first plunger and the second plunger are pivotally fixed thereto; and
the rocker valve further comprising a flexible seal member extending in a lateral direction across the first and second fluid ports, wherein the flexible seal member comprises a first sealing region attached to a plunger head of the first plunger and a second sealing region attached to a plunger head of the second plunger, wherein the flexible seal member is movable by the first plunger to a first position in which the first fluid port is closed by the first sealing region and is movable by the second plunger to a second position in which the second fluid port is closed by the second sealing region, and
wherein the rocker valve mechanism is configured such that at least one of the first and second plungers is allowed to pivotally rotate with respect to the valve body when the single pivot arm is pivoted relative to the valve body, wherein a rotation of the at least one of the first and second plungers about its respective fixed pivot is constrained by the flexible seal member to a greater degree than other components to which the at least one of the first and second plungers is connected such that a lateral position of the plunger head of the at least one of the first and second plungers is automatically adjusted by the flexible seal member to balance tensile forces in the flexible seal member around said plunger head.

2. A rocker valve according to claim 1, wherein the rocker valve mechanism is configured such that resistance to lateral movement of the plunger head of the at least one of the first and second plungers when a lateral force is applied to the plunger head is at least 0.002 N/m.

3. A rocker valve according to claim 1, wherein the flexible seal member has a lateral stiffness of at least 0.002 N/m.

4. A rocker valve according to claim 1, wherein the flexible seal member is formed from a material having a Young's modulus of at least 1 MPa.

5. A rocker valve according to claim 1, wherein the flexible seal member has a sheet thickness of from about 0.1 to about 1 mm.

6. A rocker valve according to claim 1, wherein the flexible seal member has a length to sheet thickness ratio of at least 15.

7. A rocker valve according to claim 1, wherein the first and second sealing regions each comprise a receptacle within which the plunger heads of the first and second plungers are retained.

8. A rocker valve according to claim 1, wherein the rocker valve mechanism is configured such that both the first and second plungers are allowed to pivotally rotate with respect to the valve body when the single pivot arm is pivoted relative to the valve body, wherein a rotation of both of the first and second plungers about its respective fixed pivot is constrained by the flexible seal member to a greater degree than other components to which each of the first and second plungers is connected, such that a lateral position of the first and second plunger heads is automatically adjusted by the flexible seal member to balance tensile forces in the flexible seal member around said plunger heads.

9. A rocker valve according to claim 1, further comprising a biasing device configured to exert a first biasing force on the rocker valve mechanism to bias the flexible seal member towards the first position, and further comprising an actuator configured to exert an actuation force in opposition to the first biasing force.

10. A rocker valve according to claim 9, further comprising a rocker biasing device configured to act to exert a second biasing force on the rocker valve mechanism to bias the flexible seal member towards the second position, wherein the first biasing force is greater than the second biasing force so that the flexible seal member is retained in the first position by the first plunger when the actuator is not actuated, and wherein the flexible seal member is moved to the second position when the actuator is actuated such that a sum of the actuation force and the second biasing force is greater than the first biasing force.

11. A rocker valve according to claim 9, wherein the actuator is configured to transfer the first biasing force to the first plunger in a first axial direction and to exert the actuation force on the biasing device in a second axial direction which is opposite to the first axial direction, and wherein the actuator is free to move in the second axial direction relative to the first plunger.

12. A rocker valve according to claim 11, wherein the first plunger and the actuator are moveable in the lateral direction relative to each other.

13. A rocker valve according to claim 9, wherein the actuator comprises an armature and an electromagnetic coil configured to actuate the armature to generate the actuation force, and wherein the biasing device comprises an armature biasing device configured to exert the first biasing force on the rocker valve mechanism via the armature.

14. A rocker valve according to claim 1, wherein the rocker valve mechanism is a modular rocker valve mechanism which is removable from the valve body.

15. A rocker valve according to claim 1, wherein the first and second fluid ports form part of a removable port portion of the valve body which is removable from the rocker valve.

16. A rocker valve according to claim 1, wherein the rocker valve mechanism is configured such that resistance to lateral movement of the plunger head of the at least one of the first and second plungers when a lateral force is applied to the plunger head is from 0.002 N/m to 0.04 N/m.

17. A rocker valve according to claim 1, wherein the rocker valve mechanism is configured such that resistance to lateral movement of the plunger head of the at least one of the first and second plungers when a lateral force is applied to the plunger head is from 0.004 N/m to 0.02 N/m.

18. A rocker valve according to claim 1, wherein the rocker valve mechanism is configured such that resistance to lateral movement of the plunger head of the at least one of the first and second plungers when a lateral force is applied to the plunger head is from 0.005 N/m to 0.01 N/m.

19. A rocker valve comprising:
a valve body comprising first and second fluid ports;
a rocker valve mechanism located at least partially in the valve body, consisting of:
  a pivot arm pivotally mounted relative to the valve body;
  a first plunger pivotally fixed to the pivot arm by a first fixed pivot, the first fixed pivot having a position which is fixed relative to the first plunger and the single pivot arm during pivoting of the single pivot arm; and
  a second plunger pivotally fixed to the pivot arm by a second fixed pivot, the second fixed pivot having a position which is fixed relative to the second plunger and the single pivot arm during pivoting of the single pivot arm, and the second plunger acting in opposition to and moving substantially in parallel with the first plunger when the pivot arm is pivoted relative to the valve body; and
the rocker valve further comprising a flexible seal member extending in a lateral direction across the first and second fluid ports, wherein the flexible seal member comprises a first sealing region attached to a plunger head of the first plunger and a second sealing region attached to a plunger head of the second plunger, wherein the flexible seal member is movable by the first plunger to a first position in which the first fluid port is closed by the first sealing region and is movable by the second plunger to a second position in which the second fluid port is closed by the second sealing region, and
  wherein the rocker valve mechanism is configured such that at least one of the first and second plungers is allowed to pivotally rotate with respect to the valve body when the single pivot arm is pivoted relative to the valve body, wherein a rotation of the at least one of the first and second plungers about its respective fixed pivot is constrained by the flexible seal member to a greater degree than other components to which the at least one of the first and second plungers is connected such that a lateral position of the plunger head of the at least one of the first and second plungers is automatically adjusted by the flexible seal member to balance tensile forces in the flexible seal member around said plunger head.

* * * * *

UNITED STATES PATENT AND TRADEMARK OFFICE
CERTIFICATE OF CORRECTION

| | |
|---|---|
| PATENT NO. | : 11,781,670 B2 |
| APPLICATION NO. | : 16/417056 |
| DATED | : October 10, 2023 |
| INVENTOR(S) | : Gilles Grandvallet, Raphael Alvarez and Julien Schneider |

It is certified that error appears in the above-identified patent and that said Letters Patent is hereby corrected as shown below:

In the Specification

1. In Column 2, Line number 53, should read:
'fixed pivot' means that the position of the pivot does not 2. In Column 2, Line number 66, should read:
flexible seal member' may include arrangements in which 3. In Column 3, Line number 10, should read:
As used herein, the term 'axial' refers to a direction

4. In Column 3, Line number 14, should read:
or both of the first and second fluid ports. The term 'lateral'

5. In Column 3, Line number 49, should read:
material having a Young's modulus of at least 1 MPa, more 6. In Column 3, Line number 62, should read:
The term 'sheet thickness' refers to the general thickness of 7. In Column 4, Line number 9, should read:
'length' refers to the maximum dimension of the flexible Signed and Sealed this
Twenty-first Day of November, 2023

Katherine Kelly Vidal
*Director of the United States Patent and Trademark Office*